United States Patent [19]
Bertaccini

[11] 4,147,455
[45] Apr. 3, 1979

[54] ADJUSTABLE APPARATUS FOR SUPPORTING A PIPELINE LAID ON DEEP WATERS AND FOR IMPRESSING THERETO A PRESELECTED GEOMETRICAL CONFIGURATION

[75] Inventor: Gianpaolo Bertaccini, San Donato Milanese, Italy

[73] Assignee: Snamprogetti S.p.A., Italy

[21] Appl. No.: 868,494

[22] Filed: Jan. 11, 1978

[51] Int. Cl.² .............................................. F16L 3/00
[52] U.S. Cl. .................................... 405/172; 405/229; 48/49
[58] Field of Search ................... 61/105, 107, 113, 50, 61/43; 248/49

[56] References Cited
U.S. PATENT DOCUMENTS

| | | | |
|---|---|---|---|
| 2,405,819 | 8/1946 | Dustman | 248/49 |
| 2,684,222 | 7/1954 | Miller | 248/49 |
| 3,288,406 | 11/1966 | Degen | 248/49 |
| 3,851,492 | 12/1974 | Cannon et al. | 61/113 |

*Primary Examiner*—Jacob Shapiro
*Attorney, Agent, or Firm*—Morgan, Finnegan, Pine, Foley & Lee

[57] ABSTRACT

A compact structure is disclosed for supporting a pipeline suspended over a sea bottom vale. In a preferred embodiment, the structure has a triangular outline, the sloping side of the triangle being a guideway of a wedge slidable unidirectionally, that is only upwards, until contacting the pipe to be supported.

Actuating mechanisms are provided for the movable members of the triangular structure. The entire structure is mounted on a base plate and can be towed by a subsea vehicle until reaching the correct position.

9 Claims, 4 Drawing Figures

ADJUSTABLE APPARATUS FOR SUPPORTING A PIPELINE LAID ON DEEP WATERS AND FOR IMPRESSING THERETO A PRESELECTED GEOMETRICAL CONFIGURATION

This invention relates to a simple, reliable and cheap apparatus which permits that a pipeline to be suspended on irregular spots of the sea bottom in deep waters which may be not only supported by acting from beneath the pipeline, but also may impress stress to said pipeline to impart thereto an optimum preselected geometrical outline.

It is known that the sea bottom, very often, is not thoroughly planar but includes obstacles of various kinds such as rocky spots or vales.

Inasmuch as heretofore the laying of pipelines has been restricted to shallow waters, it has been possible to prevent such shortcomings by properly varying the laying line. On account of the present evergrowing demand from laying pipelines in deep waters in it not always possible to circumvent such obstacles so that a pipeline could overhang deep and wide submarine vales.

It can thus be understood that, especially when laying pipelines on deep bottoms the problem of supporting the pipeline on the sea bottom in correspondence with vales or rocky spots with supporting members adapted to prevent that the portion of suspended pipeline may become bent with consequential detrimental kinks and bends and even breakages of the pipe.

The state of the art has already disclosed an apparatus adapted to support a pipeline supported on vales in deep sea bottom. This apparatus disclosed in the U.S. patent application No. 837,942, essentially comprises a servicing modulus which can be recovered and lowered from a servicing vessel onto the submerged pipeline to be suspended, such module being slid along two parallel guiding cables held taut between such a barge and said pipeline, and a supporting module proper which, releasably connected beneath such service module, is clamped above such pipeline, the supporting module being equipped with side legs for support which are to be driven into the sea bottom.

This apparatus is complex and requires a complex installation procedure.

It is thus an object of the present invention to provide a simple, practical and very cheap apparatus which permits, in quite a quick and reliable way, support to a pipeline suspended on a submarine vale in deep waters and to modify at will the geometrical outline of the suspended pipe section.

This object is substantially achieved by apparatus which is reduced to a simple rigid structure which does not need to be guided onto the pipeline laid in deep waters, but merely requires lowering onto the sea bottom from the servicing barge and then pushed by a subsea instrument beneath the pipeline to be supported, where such apparatus in caused to act upon the pipeline, from beneath the same, with supporting means which can be displaced upwards with a force the magnitude of which can be adjusted at leisure.

More exactly, according to a feature of the present invention, the apparatus includes a single rigid structure, the residual weight of which is made near to zero in water by floaters which can be recovered or flooded: the structure is lowered by a servicing barge onto the sea bottom and driven by a subsea means beneath the pipeline suspended at the spot at which the pipe must be supported. The structure is equipped with centered positioning means beneath said pipeline, with movable means for supporting said pipeline from beneath and for urging it upwards, with means for latching in position said movable means, and with means for laying said structure on the sea bottom as well.

According to a preferred embodiment of the invention said single rigid structure has a triangular form, said positioning means having a sloping side of said triangular structure which is dragged by said subsea means until it contacts said suspended pipeline. The movable means for supporting and urging the pipeline upward includes a wedge which can be guidably slid along said sloping side which is equipped with racks, means of a pulling mechanism acting on a cable, the mechanism is integral with said wedge and rotates about two idle pulleys which are pivoted at the ends of said inclined side. The latching means includes two nonreturn pawls which are supported by the wedge and which cooperate with the racks of the inclined side of the triangular structure the resting means include a wide base plate which is fastened beneath the base side of the triangular structure.

According to a modified version of the invention, the wedge is caused to slide along said sloping side equipped with racks of the triangular structure, by an adjustable spring mechanism or by a hydraulic and pneumatic mechanism.

This triangular apparatus can be used, obviously, only if the sea bottom, irrespective of the fact that it may be muddy, sandy or rocky, is regular enough to permit a reliable rest for the wide base plate of the apparatus and, above all, if the distance from the sea bottom of the suspended pipeline does not exceed, in correspondence of the point at which the pipeline must be supported, the height attainable by said inclined side equipped with racks of said apparatus.

According to another preferred embodiment of the invention which can be used mainly when the distance from the sea bottom of the suspended pipeline to be supported is rather high, and, would require a triangular structure which would be too bulky and heavy, the single rigid structure has a boxlike shape within which there is housed a vertically arranged hydraulic-pneumatic ram, the positioning means are formed by two long limiting rods pointing upwards, and which are, pivoted to two sides of said boxlike structure and connected each through calibrated springs to the mechanism of actuation of said hydraulic pneumatic cylinder. The actuating means actuate said ram only when the structure is dragged by said subsea means and both of said rods come into contact with said suspended pipeline. The movable means for supporting and urging the structures are formed by the piston itself of the hydraulic pneumatic ram which, being movable upwards, is equipped with racks arranged on opposite faces of the piston and is terminated at the top by a resting block for the suspended pipeline. The latching means are nonreturn pawls which are supported by said boxlike structure, cooperate with said racks of the said piston. The resting means are formed by a wide base plate which is fastened to the sea bottom wall of said boxlike structure.

If, then the sea bottom is rather uneven and rocky, according to a modification of the invention said resting means are formed, by four legs which are telescopably adjustable in the vertical direction and are pivoted at the bottom of the boxlike structure aforesaid, the free ends of such legs being connected to each other pairwise by an adjustable clevis.

In the case in which, conversely, the sea bottom is rather uneven but muddy and sandy, according to a further modification of the invention said resting means are formed by four telescopically adjustable legs which are hinged, each, at one end to the bottom wall of the boxlike structure and at the opposite end to four base plates being hinged, in their turn, with one another along two sides thereof.

By so doing, the four base plates form a single articulated base surface which can readily be adapted to any unevenness of the sea bottom.

Lastly, according to yet another modification of the invention, the piston is driven upwards for supporting and urging said suspended pipeline, by an adjustable spring mechanism.

The invention will now better be explained with reference to the accompanying drawings which illustrate a practical embodiments of the invention which are preferred and which are given by way of example only without limitation since technical and constructional modifications can be introduced without departing from the scope of the present invention.

Figure 1:
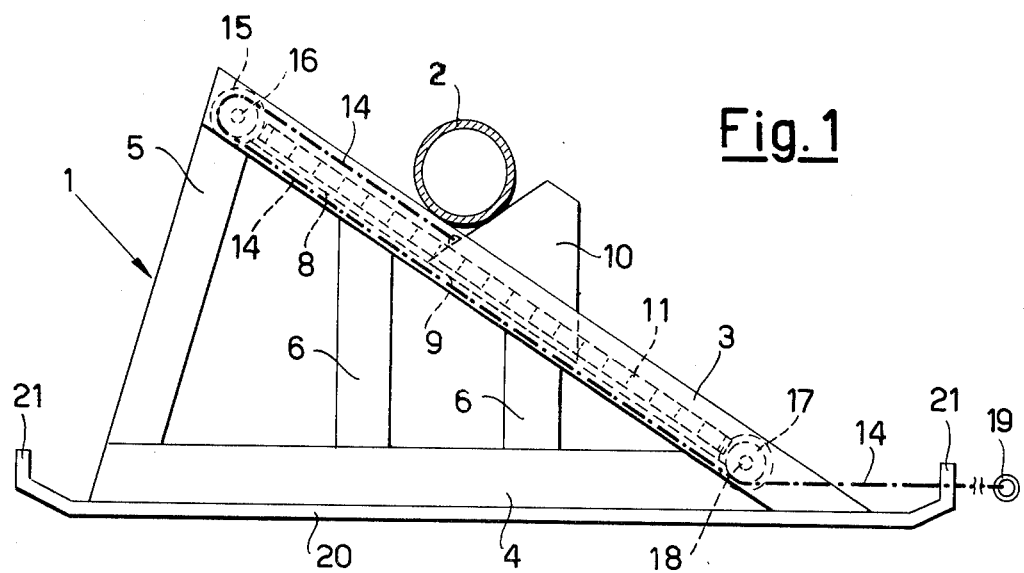
FIG. 1 is a diagrammatical front view of apparatus according to the invention.
Figure 2:
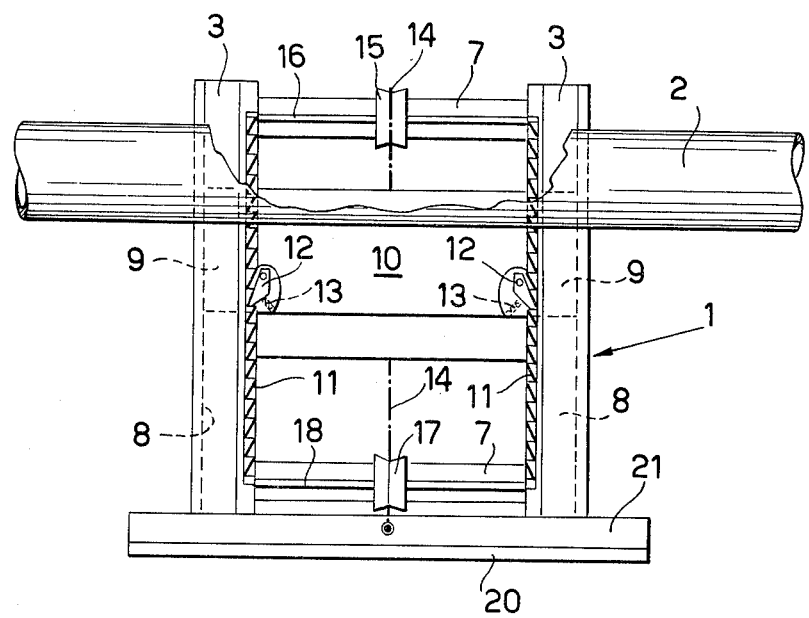
FIG. 2 is a side elevational view of the apparatus of FIG. 1.

Having now reference to FIGS. 1 and 2, the numeral 1 indicates the rigid structure having the shape of a triangle for supporting and urging a pipeline 2 which is suspended above a vale of the sea bottom in deep waters. The structure is composed substantially by two triangular frames, each of which is composed by a sloping beam or side, 3, by a base side or beam 4 by a supporting beam or side 5 and also by reinforcing struts 6 which are connected in parallel with each other by connection struts 7 (in FIG. 1 a single frame can be seen, the other being copolanar). On the confronting surfaces of the sloping sides 3 of the structure there is formed a longitudinal guide 8 for the two side wings 9 of a wedge 10 and there are two racks 11 which cooperate with two nonreturn pawls 12 hinged to said wedge 10 and biassed by springs 13, so that the wedge can only rise along the sloping sides 3 but it cannot slip backwards. The wedge is urged upwards, guided by the sloping sides 3, through a pulling mechanism not shown in the drawings, mounted in the same structure or on a subsea vehicle, acts upon a cable 14 which, fastened at one end to the wedge, is wrapped around a first idle pulley 15 mounted on an axle 16 supported by the top ends of the sloping sides 3 of the structure, and then around a second idle pulley 17 mounted on an axle 18 supported by the lower ends of the sloping sides 3. FIG. 1 also shows a ring 19 fastened to the other end of the cable 14 to facilitate the connection to the pulling mechanism of the submarine vehicle. Finally, beneath the base side 4 of the triangular structure there is affixed a wide base plate 20 which has edges 21 for facilitating the dragging of the structure beneath the suspended pipeline to be supported by the subsea vehicle.

The residual weight of the apparatus in water can be reduced to zero by recoverable or floodable floaters, not shown. The installation and the operation of such an apparatus is now described.

Once a subsea vehicle has mapped the configuration of the pipeline suspended over the submarine vale, the calculations of the stresses are effected so as to determine the point of location of the supporting member and the magnitude of the upwards push to be impressed on the pipeline to have it take an optimal geometrical configuration. The triangular structure is then lowered by a servicing barge on the sea bottom in the vicinity of the suspended pipeline and is pushed by the subsea vehicle towards the pipeline until the sloping sides 3 of the structure comes into contact with the pipeline. At this stage, the pulling mechanism is actuated, which, through the cable and pulley system, impresses an upward thrust on the wedge which is equal to the calculated stress.

Also possible yielding of the sea bottom under the weight of the pipeline filled with water for testing, which can cause separation of the pipeline from the supporting member after testing, can now be readily allowed for by lifting the wedge farther up.

Figure 3:
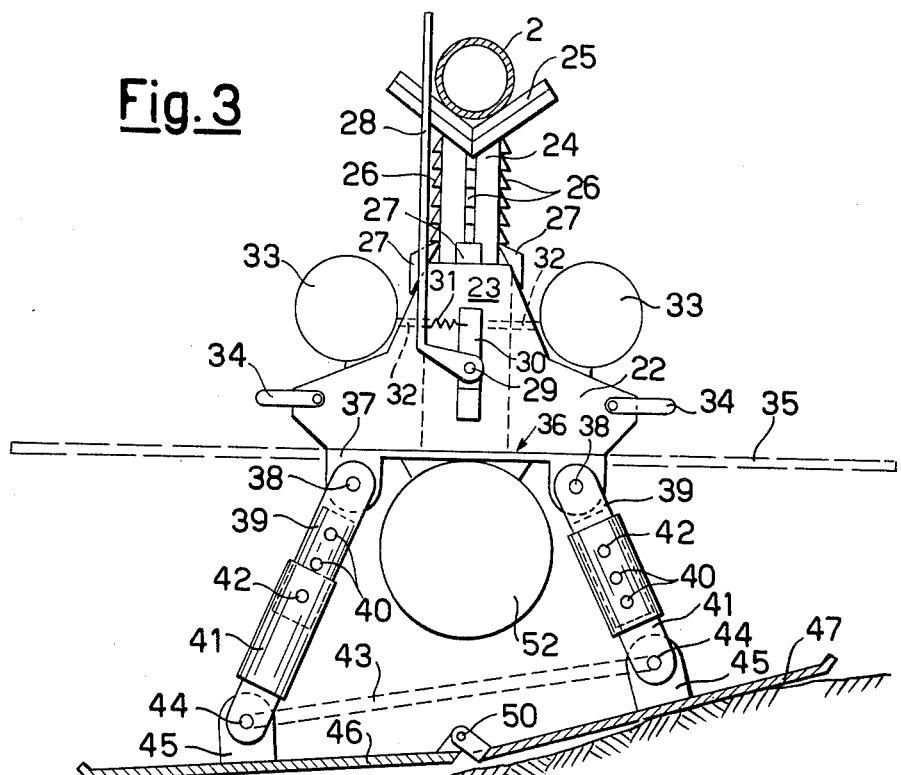
FIG. 3 is a diagrammatical front view of another apparatus according to the invention.
Figure 4:
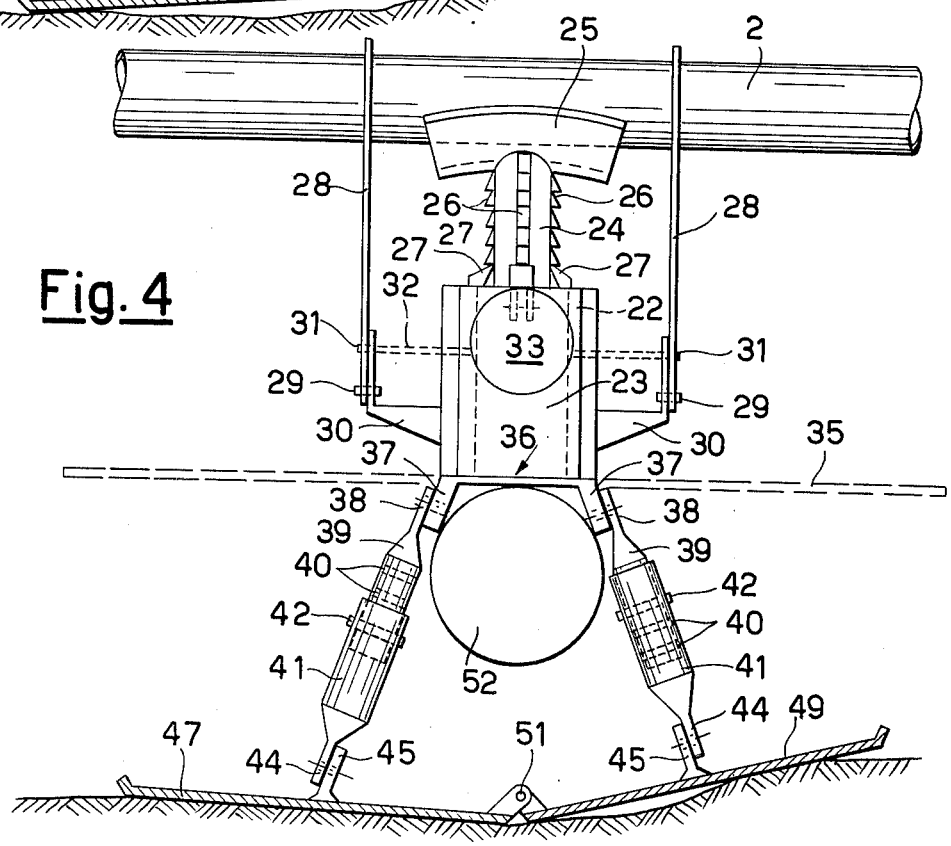
FIG. 4 is a side view of the apparatus of FIG. 3.

In FIGS. 3 and 4 there is shown, another embodiment of the invention is shown for supporting and urging a pipeline 2 suspended over a subsea vale in deep water when such a vale is comparatively deep.

This apparatus has a rigid structure 22 having a boxlike shape within which is mounted a vertically arranged hydraulic and pneumatic ram 23. The piston 24 of the ram supports, at its free end, a resting block 25 which has, viewed from the front, a V-like section while longitudinally it has an arcuate profile so as to be adapted to rest beneath pipelines of different diameters. On opposite surfaces of the piston 24 there are provided racks 26 which cooperate with nonreturn pawls 27 biassed by springs and hinged to the structure 22, so that the piston can only go up with no reverse motion being allowed. Two long limiting rods 28, arranged upwards, are hinged by pins 29 to stirrups 30 integral with the two front sides of the boxlike structure 22 and are connected, through calibrated springs 31, to the actuating mechanism of the ram 23. This mechanism diagrammatically shown in the drawings in dotted lines 32, acts substantially on two inlet valves for the ram 22 of the fluid under pressure contained in the reservoirs 33 mounted on the boxlike structure 22, said valves being opened by the same limiting rods 28 as the latter both resting on the suspended pipeline are rotated about their pintles 29 by a further dragging of the apparatus by the subsea vehicle. FIG. 3 also shows the rings 34 for connecting the apparatus to the submarine vehicle which must drag it.

A wide base plate 35 (in dotted lines in the drawing) is affixed to the bottom 36 of the boxlike structure 22. As an alternative, to the bottom wall 36 there can be fastened a plate 37 to which there are hinged, via the pins 38, four telescopically adjustable legs the height of which can thus be varied. Each leg (the drawings show only two legs, the other two being coplanar) is formed by a rod 39 having bores 40 and hinged at 38 to the plate 37, and is inserted into a hollow body 41 to which it is locked in position by a through-pin 42 inserted in one of the bores 40 of the rod. The free lower ends of the hollow bodies 41 are mutually connected pairwise by adjustable clevis 43 (diagrammatically indicated in dotted lines in FIG. 3). As another alternative, the bodies 41 are hinged by the pins 44, to stirrups 45 welded centrally to a base plate, such as 46, 47, 48 and 49 respectively. The four base plates 46-49 are hinged mutually along two of their sides so as substantially to form a single articulated base plate. More particularly the base plate 47 is hinged to the adjoining plate 46 through a pin 50 (see FIG. 3) directed along the axis of the pipeline 2 and is also hinged to the equally adjoining plate 49 (see FIG. 4) through the pin 51 directed perpendicularly to said axis.

In the drawings there can also be seen at 52 a floater which has the task of nearly annulling the residual weight in water of the machine so as to facilitate the towing by the subsea vehicle. The floater is intended to be disposed of by recovery or waterlogging when the apparatus is in position beneath the pipeline to be supported.

The installation and the operation of the apparatus are substantially similar to those of the machine described hereinabove. In this latter machine, however, the actuation of the ram 23, which will impress with its piston a thrust against the pipeline which is suspended, said thrust being equal to the calculated stress, using the pressure which has been preselected in the two reservoirs, will be made automatically as already explained, by the positioning means, that is by the limiting rods 28 without necessity of controls from outside.

I claim:

1. Apparatus for supporting on the sea bottom and for causing a preselected geometrical configuration to be taken by a submerged pipeline suspended over a subsea vale in deep waters, comprising a single rigid structure adapted to be towed on the sea bottom to the suspended pipeline which includes:
    a wide base means on the bottom of said structure for facilitating movement thereof along the sea bottom and for resting beneath the suspended section of the pipeline,
    positioning means on said structure for contacting the suspended section of the pipeline when said structure has been moved therebelow,
    movable means on said structure for supporting and moving upwardly the suspended section of pipeline to the preselected geometric configuration when said structure has been positioned beneath, and said positioning means is in contact with, the suspended pipeline section,
    actuating means connecting said movable means for moving said movable means upwardly,
    rack means operatively connected to said positioning means and to said movable means and adapted to allow upward movement of said movable means on said structure, and
    locking means on said structure which cooperates with said rack means to automatically lock said movable means in position when said movable means has moved the suspended pipeline to the preselected geometric configuration.

2. The apparatus according to claim 10, wherein the residual weight of said rigid structure in water is reduced to near zero by floaters connected thereto which either can be recovered or flooded.

3. An apparatus according to claim 1, characterized in that said wedge is slidably guided along the sloping side equipped with racks of the triangular frame through an adjustable-spring mechanism.

4. An apparatus according to claim 1, characterized in that said wedge is slidably guided along the inclined side equipped with racks of the triangular frame through a hydraulic and pneumatic mechanism.

5. Apparatus for supporting on the sea bottom and for causing a preselected geometrical configuration to be taken by a submerged pipeline suspended over a subsea vale in deep waters, comprising a single rigid structure adapted to be towed on the sea bottom to the suspended pipeline which includes:
    a wide base means on the bottom of said structure for facilitating movement thereof along the sea bottom and for resting beneath the suspended section of the pipeline,
    a rigid triangular frame affixed to said wide base means which includes a sloping side for contacting the suspended section of the pipeline when said structure has been moved therebelow, and wherein two racks are positioned along the inner lateral edges of said sides,
    a wedge slidably connected to said frame partially within said sloping side for supporting and moving upwardly along said sloping side the suspended pipeline section to the preselected geometric configuration thereof when said frame has been positioned beneath the suspended pipeline section,
    a pulling mechanism having two idle pulleys hinged at the ends of said sloping sides and a cable about said pulleys and connected to said wedge for upward movement thereof along said sloping sides, and
    two non-return pawles hinged to said wedge which cooperate with said racks for locking said wedge in position when said wedge has moved the suspended pipeline section to the preselected geometric position.

6. Apparatus for supporting on the sea bottom and causing a preselected geometrical configuration to be taken by a submerged pipeline suspended over a subsea vale in deep waters, comprising a single rigid structure adapted to be towed on the sea bottom to the suspended pipeline which includes:
    a wide base means on the bottom of said structure for facilitating movement thereof along the sea bottom and for resting beneath the suspended section thereof,
    a rigid box-like structure connected to said wide base means, and within which is mounted a vertically arranged hydraulic and pneumatic ram having an actuation mechanism therein and a piston extending therefrom with a resting block thereon for supporting the section of suspended pipeline when said structure has been moved therebelow,
    two long limiting upwardly extending rods which are hinged to two sides of said box-like structure and which are connected, each, through calibrated springs to said actuation mechanism for upward actuation of said ram piston and resting block only when said rods contact said section of the suspended pipeline as said structure is moved therebelow,
    racks on opposite sides of said piston, and
    non-return pawles supported by said box-like structure which cooperate with said racks to automatically lock said upwardly extended piston and resting block in position when the suspended pipeline section has been moved to its preselected geometric configuration.

7. An apparatus according to claim 6, characterized in that said wide base has four legs which can be telescopically adjusted as to their height and are hinged to the bottom wall of said boxlike structure, the free end of said legs being connected to each other, pairwise, by two adjustable clevises.

8. An apparatus according to claim 6, characterized in that said wide base has four telescopically adjustable legs which are hinged, each, at one end to the bottom wall of the boxlike structure and, at the other end, to a base plate, the four base plates being, in their turn, hinged to one another along two sides thereof, to thereby form said wide base.

9. An apparatus according to claim 6, characterized in that said piston is urged upwards for supporting and thrusting said suspended pipeline by an adjustable-spring mechanism.

* * * * *

UNITED STATES PATENT AND TRADEMARK OFFICE
CERTIFICATE OF CORRECTION

PATENT NO. : 4,147,455
DATED : April 3, 1979
INVENTOR(S) : Gianpaolo Bertaccini

It is certified that error appears in the above-identified patent and that said Letters Patent are hereby corrected as shown below:

First page, after line "[22]", insert the following lines:

-- [30] Foreign Application Priority Data

January 18, 1977    Italy ....19386 A/77 --.

Signed and Sealed this

Twenty-fifth Day of March 1980

[SEAL]

Attest:

SIDNEY A. DIAMOND

*Attesting Officer*    *Commissioner of Patents and Trademarks*